US009784222B2

United States Patent
Hotta

(10) Patent No.: US 9,784,222 B2
(45) Date of Patent: Oct. 10, 2017

(54) CONTROLLER FOR INTERNAL COMBUSTION ENGINE

(71) Applicant: TOYOTA JIDOSHA KABUSHIKI KAISHA, Toyota-shi, Aichi-ken (JP)

(72) Inventor: Shintaro Hotta, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 22 days.

(21) Appl. No.: 15/072,770

(22) Filed: Mar. 17, 2016

(65) Prior Publication Data

US 2016/0273494 A1 Sep. 22, 2016

(30) Foreign Application Priority Data

Mar. 19, 2015 (JP) .................. 2015-056390

(51) Int. Cl.
*F02M 33/04* (2006.01)
*F02M 25/08* (2006.01)
(Continued)

(52) U.S. Cl.
CPC ......... *F02M 25/0836* (2013.01); *F01N 3/101* (2013.01); *F02B 25/145* (2013.01); *F02D 13/0261* (2013.01); *F02D 41/0007* (2013.01); *F02D 41/0032* (2013.01); *F02D 41/0045* (2013.01); *F02D 41/1446* (2013.01); *F02D 41/1454* (2013.01); *F02D 41/3017* (2013.01); *F02D 2041/001* (2013.01); *F02D 2200/0406* (2013.01); *F02M 25/0854* (2013.01); *Y02T 10/22* (2013.01); *Y02T 10/47* (2013.01)

(58) Field of Classification Search
CPC ............... F02D 41/004; F02D 41/1454; F02D 41/1446; F02D 41/0032; F02D 41/0007; F02D 41/3017; F02D 13/0261; F02D 2200/0406; F02D 2041/001; F02M 25/0836; F02M 25/0854; F02B 25/145; F01N 3/101; Y02T 10/22; Y02T 10/47
USPC ...................... 123/559.1, 516, 518, 519, 520
See application file for complete search history.

(56) References Cited

U.S. PATENT DOCUMENTS

| 7,743,752 B2 * | 6/2010 | Kerns ................. F02D 41/0042 123/520 |
| 9,109,550 B2 * | 8/2015 | Kempf ............... F02M 25/0836 |

(Continued)

FOREIGN PATENT DOCUMENTS

| JP | 2003-106141 A | 4/2003 |
| JP | 2011-196196 A | 10/2011 |
| JP | 2014-181681 A | 9/2014 |

*Primary Examiner* — Hai Huynh
(74) *Attorney, Agent, or Firm* — Andrews Kurth Kenyon LLP

(57) ABSTRACT

A controller for an internal combustion engine is provided. The engine includes a compressor, a three way catalyst, a canister, an evaporated fuel passage, an ejector, and a purge control valve. The controller includes an ECU. The ECU is configured to decrease an opening degree of the purge control valve in response to an increase in pressure on the downstream side of the compressor in a lean supercharging range. The is a range in which an operation air-fuel ratio of the internal combustion engine is leaner than a theoretical air-fuel ratio of the internal combustion engine, and in which the pressure on the downstream side of the compressor is higher than pressure on the upstream side of the compressor.

10 Claims, 4 Drawing Sheets

(51) Int. Cl.
*F01N 3/10* (2006.01)
*F02D 41/00* (2006.01)
*F02D 41/14* (2006.01)
*F02B 25/14* (2006.01)
*F02D 13/02* (2006.01)
*F02D 41/30* (2006.01)

(56) References Cited

U.S. PATENT DOCUMENTS 9,382,825 B2 * 7/2016 Pursifull .............. F01M 13/022
9,528,473 B2 * 12/2016 Dudar ................ F02M 25/0836

* cited by examiner

CONTROLLER FOR INTERNAL COMBUSTION ENGINE

INCORPORATION BY REFERENCE

The disclosure of Japanese Patent Application No. 2015-056390 filed on Mar. 19, 2015 including the specification, drawings and abstract is incorporated herein by reference in its entirety.

BACKGROUND

1. Field

The configuration relates to a controller for an internal combustion engine with a supercharger, the controller allowing an operation at a leaner air-fuel ratio than a theoretical air-fuel ratio.

2. Description of Related Art

Japanese Patent Application Publication No. 2014-181681 (JP 2014-181681 A) below discloses an internal combustion engine that is configured to suction evaporated fuel from a canister via an ejector by using differential pressure between an upstream side and a downstream side of a compressor of a supercharger and to purge the evaporated fuel into the upstream side of the compressor in an intake passage. According to this configuration, even in a supercharging range where intake manifold pressure is higher than atmospheric pressure, the evaporated fuel that is stored in the canister can be purged and processed into the intake passage.

There is a case where the intake manifold pressure becomes higher than exhaust manifold pressure in the internal combustion engine with the supercharger. At this time, in a valve overlapping period in which both of an exhaust valve and an intake valve are opened, scavenging occurs, that is, a phenomenon where intake air is blown from the intake manifold to the exhaust manifold. When scavenging occurs, the evaporated fuel that is purged into the intake passage remains uncombusted and is blown together with the intake air to the exhaust manifold. Meanwhile, a three-way catalyst (in more detail, a start catalyst disposed directly downstream of a turbine) is generally provided in an exhaust passage. Thus, the blown evaporated fuel can be purified by the three-way catalyst.

By the way, when the internal combustion engine is operated at a leaner air-fuel ratio than a theoretical air-fuel ratio, an exhaust gas temperature becomes lower than that when the internal combustion engine is operated at the theoretical air-fuel ratio. When the exhaust gas temperature is decreased, a temperature of the three-way catalyst, which is provided in the exhaust passage, is also decreased. Furthermore, when an operation air-fuel ratio is leaner than the theoretical air-fuel ratio, oxygen concentration in exhaust gas is increased. Thus, the noble metal of the three-way catalyst is more likely to be subjected to oxygen poisoning. In particular, in a situation where scavenging occurs, the intake air directly flows into the three-way catalyst. Thus, the oxygen poisoning of the three-way catalyst is further likely to occur. Because of these reasons, when the operation air-fuel ratio of the internal combustion engine is leaner than the theoretical air-fuel ratio, the evaporated fuel that is blown by scavenging may not sufficiently be purified due to degradation of purification performance of the three-way catalyst.

SUMMARY

A controller for an internal combustion engine capable of suppressing degradation of emission performance that is caused by blowing of evaporated fuel to an exhaust passage is provided.

According to one aspect of the embodiment, an internal combustion engine includes a compressor, a three-way catalyst, a canister, an evaporated fuel passage, an ejector, and a purge control valve. The compressor is provided in an intake passage. The three-way catalyst is provided in an exhaust passage. The canister is configured to store evaporated fuel generated in a fuel tank. The evaporated fuel passage is configured to connect the canister and an upstream side of the compressor in the intake passage. The ejector is configured to suction the evaporated fuel from the canister by differential pressure between the upstream side of the compressor and a downstream side of the compressor, and the purge control valve is provided between the canister and the ejector in the evaporated fuel passage. The controller includes an electronic control unit. The electronic control unit is configured to decrease an opening degree of the purge control valve in response to an increase in pressure on the downstream side of the compressor in a lean supercharging range. The lean supercharging range is a range in which an operation air-fuel ratio of the internal combustion engine is leaner than a theoretical air-fuel ratio of the internal combustion engine, and in which the pressure on the downstream side of the compressor is higher than pressure on the upstream side of the compressor.

When the pressure on the downstream side of the compressor is increased, purging of the evaporated fuel from the canister to the intake passage is promoted by an action of the ejector. However, at the same time, a possibility of blowing of the evaporated fuel by scavenging is also increased. According to the controller according to the configuration, an opening degree of the purge control valve is decreased in response to the increase in the pressure on the downstream side of the compressor. Thus, an increase in a purge amount of the evaporated fuel can be suppressed in a situation where scavenging is likely to occur. Furthermore, by conducting this operation in the lean supercharging range, the evaporated fuel can be suppressed from flowing into the three-way catalyst, purification capacity of which is degraded.

According to another aspect of the embodiment, the electronic control unit is configured to fully close the purge control valve in a first operation range. In the first operation range, the suctioned air is blown from the intake passage to the exhaust passage. The first operation range is included in the lean supercharging range.

According to this configuration, blowing of the evaporated fuel to the exhaust passage can reliably be suppressed.

According to another aspect of the embodiment, the electronic control unit is configured to fully close the purge control valve in a second operation range. A valve opening period of an exhaust valve and a valve opening period of an intake valve overlap in the second operation range. The second operation range is included in the lean supercharging range.

According to another aspect of the embodiment, purge gas is introduced from the canister to the intake passage. When fuel concentration of purge gas is not decreased to a threshold after the opening degree of the purge control valve is decreased, the electronic control unit is configured to: i) reduce an overlapping amount between the valve opening period of the exhaust valve and the valve opening period of the intake valve, and ii) increase the opening degree of the purge control valve. By reducing the overlapping amount, blowing of the evaporated fuel is suppressed. In addition, by increasing the opening degree of the purge control valve, the purge amount of the evaporated fuel can be increased.

According to another aspect of the embodiment, after the opening degree of the purge control valve is decreased, the electronic control unit is configured to: i) switch the operation air-fuel ratio of the internal combustion engine to the theoretical air-fuel ratio when the fuel concentration of the purge gas that is introduced from the canister to the intake passage is not decreased to the threshold, and ii) increase the opening degree of the purge control valve. While an exhaust gas temperature is increased and purification performance of the three-way catalyst is improved by switching the operation air-fuel ratio to the theoretical air-fuel ratio, the purge amount of the evaporated fuel can be increased by increasing the opening degree of the purge control valve.

According to another aspect of the embodiment, a control method for a vehicle is provided. The control method includes a compressor, a three-way catalyst, a canister, an evaporated fuel passage, an ejector, a purge control valve and an electronic control unit. The compressor is provided in an intake passage, and the three-way catalyst is provided in an exhaust passage. The canister is configured to store evaporated fuel generated in a fuel tank, and the evaporated fuel passage is configured to connect the canister and an upstream side of the compressor in the intake passage. The ejector is configured to suction the evaporated fuel from the canister by differential pressure between the upstream side of the compressor and a downstream side of the compressor. The purge control valve is provided between the canister and the ejector in the evaporated fuel passage. The control method includes decreasing an opening degree of the purge control valve in response to an increase in pressure on the downstream side of the compressor by the electronic control unit in a lean supercharging range. The lean supercharging range is a range in which an operation air-fuel ratio of the internal combustion engine is leaner than a theoretical air-fuel ratio of the internal combustion engine. The lean supercharging range is a range in which the pressure on the downstream side of the compressor is higher than pressure on the upstream side of the compressor.

As it has been described so far, according to the controller according to the configuration, in the lean supercharging range, an increase in the purge amount of the evaporated fuel can be suppressed by decreasing the opening degree of the purge control valve in response to the increase in the pressure on the downstream side of the compressor in a situation where scavenging is likely to occur. Thus, it is possible to suppress degradation of emission performance that is caused by flowing of the evaporated fuel into the three-way catalyst, the purification capacity of which is degraded.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

A description will hereinafter be made on an embodiment with reference to the drawings. It should be noted that, in the case where a numerical value of each element, such as the number of units, a quantity, an amount, or a range, is referred in the embodiment below, the configuration is not limited to the referred value unless it is clearly and explicitly specified or it is obviously and principally specified to the value. In addition, a structure, steps, or the like that will be described in the embodiment below is not essential to the configuration unless it is clearly and explicitly specified or it is obviously and principally specified thereto.

Figure 1:
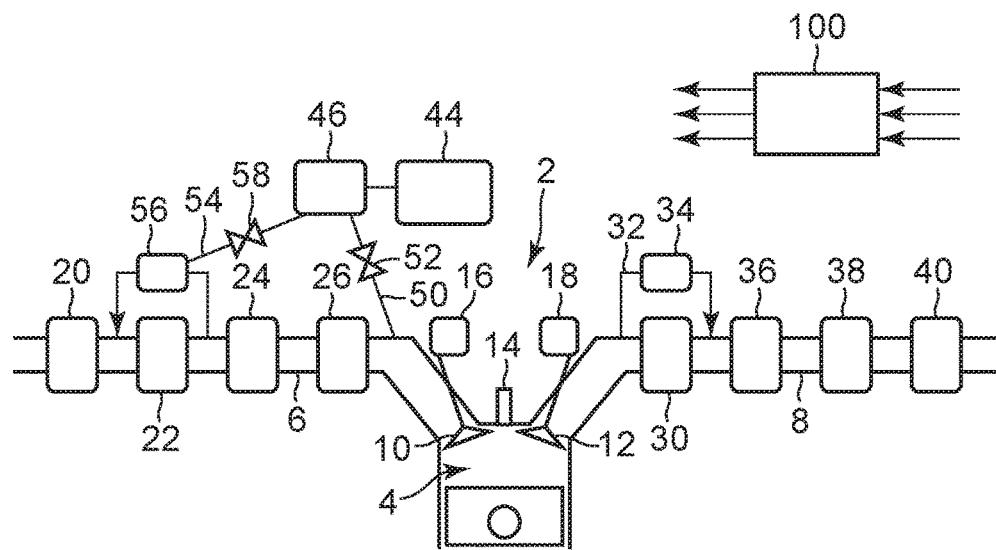
FIG. 1 is a view of a configuration of an engine system in an embodiment.

FIG. 1 is a view of a configuration of an engine system in the embodiment. The engine system of this embodiment includes an internal combustion engine 2 with a turbocharger that is mounted as a power device in an automobile. The internal combustion engine 2 will hereinafter be referred to as an engine. This engine 2 is a lean-burn engine that can select a stoichiometric operation and a lean operation. The stoichiometric operation is an operation at a theoretical air-fuel ratio. The lean operation is an operation at a leaner air-fuel ratio than the theoretical air-fuel ratio. An air-fuel ratio during the lean operation is set to a specified air-fuel ratio. The specified air-fuel ratio is in a leaner air-fuel ratio range than an air-fuel ratio range in which a large amount of NOx is produced.

The engine 2 is a spark-ignition type engine. As an igniter, an ignition plug 14 is attached to a top of a combustion chamber 4 of each cylinder. The number of the cylinders and arrangement of the cylinders in the engine 2 are not particularly limited. An intake passage 6 and an exhaust passage 8 are connected to the combustion chamber 4. A communication state between the combustion chamber 4 and the intake passage 6 is controlled by an intake valve 10. A communication state between the combustion chamber 4 and the exhaust passage 8 is controlled by an exhaust valve 12. The intake valve 10 is provided with a variable intake valve mechanism 16 that makes valve timing of the intake valve 10 variable. The exhaust valve 12 is provided with a variable exhaust valve mechanism 18 that makes valve timing of the exhaust valve 12 variable. A known mechanism for changing a phase of a camshaft with respect to a crankshaft can be used as the mechanism that makes the valve timing variable. In addition, although not shown, an in-cylinder injection valve and a port injection valve are provided in each cylinder. The in-cylinder injection valve is configured to inject fuel directly into the combustion chamber 4. The port injection valve is configured to inject the fuel to an intake port.

An air cleaner 20 is provided in an uppermost stream portion of the intake passage 6. A compressor 22 of a turbocharger is provided on a downstream side of the air cleaner 20 in the intake passage 6. An intercooler 24 for cooling intake air that is compressed by the compressor 22 is provided on a downstream side of the compressor 22 in the intake passage 6. An electronically-controlled throttle 26 is provided on a downstream side of the intercooler 24 in the intake passage 6. Although not shown, a portion of the intake passage 6 that is on a downstream side of the throttle 26 is an intake manifold. The intake manifold distributes the intake air to the intake port of each cylinder.

Although not shown, an uppermost stream portion of the exhaust passage 8 is an exhaust manifold. The exhaust manifold collects the exhaust gas which is discharged from an exhaust port of each cylinder. A turbine 30 of the turbocharger is provided on a downstream side of the exhaust manifold in the exhaust passage 8. A bypass passage 32 is provided in the exhaust passage 8. The bypass passage 32 connects between an upstream side and a downstream side of the turbine 30 for bypassing. A waste gate valve 34 is installed in the bypass passage 32. On the downstream side of the turbine 30 in the exhaust passage 8, a three-way catalyst 36, a NOx storage-reduction catalyst 38, and a selective catalytic reduction catalyst 40 are sequentially provided from the upstream side.

The engine system of this embodiment includes a canister 46 for temporarily adsorbing and storing evaporated fuel. The evaporated fuel is generated in a fuel tank 44. The canister 46 is connected to the downstream side of the throttle 26 in the intake passage 6 by a first evaporated fuel passage 50. A first purge control valve 52 is provided in the first evaporated fuel passage 50. The first purge valve 52 is a downstream-side purge control valve. The first purge control valve 52 is a vacuum switching valve (VSV) or a vacuum regulating valve (VRV). When intake manifold pressure that is pressure on the downstream side of the throttle 26 in the intake passage 6 is negative pressure, the evaporated fuel is suctioned from the canister 46 into the first evaporated fuel passage 50 by an action of the negative pressure, and then the evaporated fuel is purged from the first evaporated fuel passage 50 into the intake passage 6. In a supercharging range where supercharging by the compressor 22 is conducted, the intake manifold pressure becomes higher than atmospheric pressure. Thus, purging of the evaporated fuel from the first evaporated fuel passage 50 is stopped. It should be noted that, although not shown, a check valve for preventing a backflow is provided in the first evaporated fuel passage 50.

In addition, the canister 46 is connected to an upstream side of the compressor 22 in the intake passage 6 by a second evaporated fuel passage 54. The second evaporated fuel passage 54 is provided with an ejector 56 for suctioning the evaporated fuel from the canister 46 by using differential pressure between the upstream side and the downstream side of the compressor 22. A second purge control valve (an upstream-side purge control valve) 58 is provided between the canister 46 and the ejector 56 in the second evaporated fuel passage 54. The second purge control valve 58 is a VSV or a VRV. When the compressor 22 is actuated and the differential pressure is generated between the upstream side and the downstream side thereof, the evaporated fuel is suctioned from the canister 46 to the second evaporated fuel passage 54 by an action of the ejector 56, and the evaporated fuel is purged from the second evaporated fuel passage 54 to the intake passage 6. In a natural aspiration range (NA range) where supercharging by the compressor 22 is not conducted, the differential pressure is not generated between front and rear of the compressor 22. Thus, the ejector 56 does not function, and purging of the evaporated fuel from the second evaporated fuel passage 54 is stopped.

The engine system of this embodiment includes a controller 100 for controlling the engine 2. The controller 100 at least includes an electronic control unit (ECU) that has an input/output interface, a CPU, a ROM, and a RAM. The input/output interface is provided to receive sensor signals from various sensors that are attached to the engine 2 and a vehicle and output an operation signal to an actuator that constitutes the engine 2. The ROM stores various control programs and maps for controlling the engine 2. The CPU reads out and executes the control program from the ROM and generates the operation signal on the basis of the received sensor signals.

Figure 2:
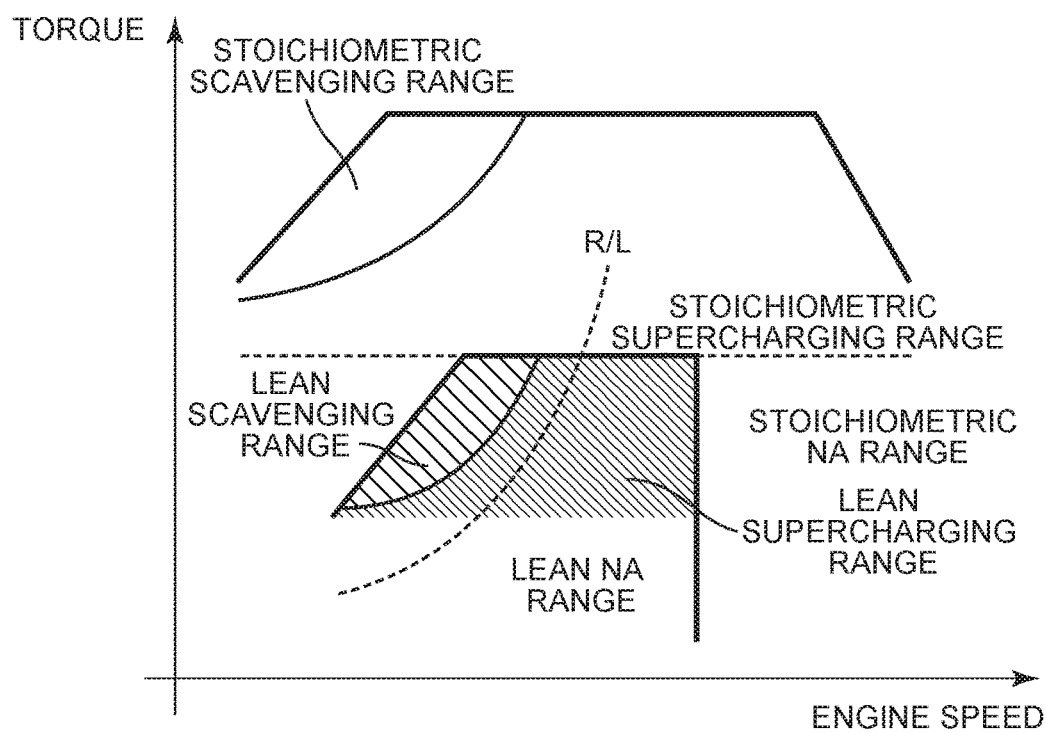
FIG. 2 is a chart for explaining an operation mode of an engine.

The controller 100 determines an operation mode of the engine 2 on the basis of requested torque to the engine 2 and a speed of the engine 2. As the operation mode of the engine 2 that is selected by the controller 100, a lean operation mode in which an operation air-fuel ratio of the engine 2 is set to the leaner air-fuel ratio than the theoretical air-fuel ratio and a stoichiometric operation mode in which the operation air-fuel ratio of the engine 2 is set to the theoretical air-fuel ratio are included. In FIG. 2, on a plane with the torque and the engine speed as coordinate axes, an outer edge of a range where the lean operation mode is selected and an outer edge of a range where the stoichiometric operation mode is selected are each drawn by a bold line.

The range where the lean operation mode is selected is divided into a lean NA range that is an operation range on a low-torque side and a lean supercharging range that is an operation range on a high-torque side. The lean supercharging range corresponds to an operation range that is hatched in FIG. 2. The lean NA range is an operation range where supercharging by the compressor 22 is not conducted and the intake manifold pressure is lower than the atmospheric pressure. The lean supercharging range is an operation range where supercharging by the compressor 22 is conducted and the intake manifold pressure is the atmospheric pressure or higher. A high-torque low-speed range within the lean supercharging range is an operation range where scavenging actively occurs. This operation range is referred to as a lean scavenging range. In the lean scavenging range, the intake manifold pressure is higher than exhaust manifold pressure (back pressure). Under such a condition, valve timing of the intake valve 10 is advanced to increase filling efficiency of fresh air. Thus, an overlapping amount (a valve overlapping amount) between a valve opening period of the intake valve 10 and a valve opening period of the exhaust valve 12 is increased, and the intake air is thereby blown from the intake passage 6 to the exhaust passage 8. The operation range in which a valve opening period of the intake valve 10 and a valve opening period of the exhaust valve 12 overlap is an example of the second operation range.

A range where the stoichiometric operation mode is selected is divided into a stoichiometric NA range that is an operation range on the low-torque side and a stoichiometric supercharging range that is an operation range on the high-torque side (an operation range on an upper side of a broken line in FIG. 2). The stoichiometric NA range is an operation range where supercharging by the compressor 22 is not conducted and the intake manifold pressure is lower than the atmospheric pressure. The stoichiometric supercharging range is an operation range where supercharging by the compressor 22 is conducted and the intake manifold pressure is the atmospheric pressure or higher. A high-torque low-speed range within the stoichiometric supercharging range is an operation range where scavenging actively occurs (this operation range is referred to as a stoichiometric scavenging range). In the stoichiometric scavenging range, the intake manifold pressure is higher than the exhaust manifold pressure, and the valve timing of the intake valve 10 is advanced. Thus, the valve overlapping amount is increased.

It should be noted that the waste gate valve 34 is fully opened in the lean NA range and the stoichiometric NA range and that the intake manifold pressure is controlled in accordance with an opening degree of the throttle 26. In a boundary between the lean NA range and the lean supercharging range as well as a boundary between the stoichiometric NA range and the stoichiometric supercharging range, the waste gate valve 34 is fully opened, and the throttle 26 is also fully opened. In addition, the throttle 26 remains fully opened in the lean supercharging range and the stoichiometric supercharging range, and the intake manifold pressure is controlled in accordance with a closing degree of the waste gate valve 34 (a degree of closing with the full opening being a reference).

FIG. 2 shows an example of a road load line (R/L). During acceleration, an operation point of the engine 2 moves from the lean NA range to the lean supercharging range along this line. When the operation point of the engine 2 enters the lean supercharging range, the intake manifold pressure becomes the atmospheric pressure or higher. The lean scavenging range within the lean supercharging range is the operation range where scavenging actively occurs. However, scavenging possibly occurs in the lean supercharging range other than the lean scavenging range due to a relationship between the intake manifold pressure and the back pressure.

In the lean supercharging range, the differential pressure is generated between the upstream side and the downstream side of the compressor 22. Accordingly, the evaporated fuel is suctioned from the canister 46 into the second evaporated fuel passage 54 by the ejector 56. Then, the evaporated fuel is purged to the upstream side of the compressor 22 in the intake passage 6. When scavenging occurs, the evaporated fuel that is purged into the intake passage 6 remains uncombusted and blown together with the intake air to the exhaust passage 8. In order to suppress degradation of emission performance caused by this configuration, the controller 100 operates the second purge control valve (the upstream-side purge control valve) 58 as follows so as to suppress purging of the evaporated fuel in a situation where scavenging is likely to occur.

Figure 3:
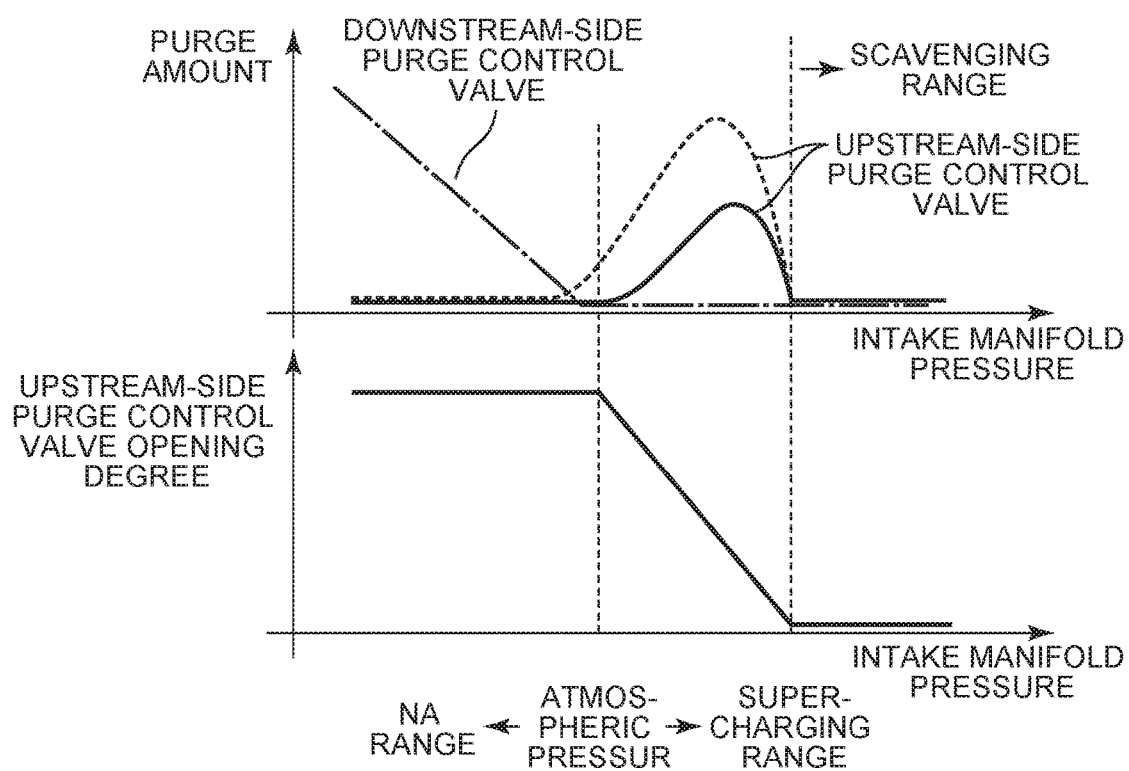
FIG. 3 is a chart for explaining opening degree control of an upstream-side purge control valve.

FIG. 3 is a chart for explaining opening degree control of the second purge control valve 58. FIG. 3 illustrates a graph that shows a relationship between the intake manifold pressure and a purge amount and a graph that shows a relationship between the intake manifold pressure and an opening degree of the second purge control valve 58. Here, the purge amount is an amount of gas that is purged into the intake passage per unit time. The second purge control valve is the upstream-side purge control valve.

As indicated in the graph of a lower stage, in the lean NA range where the intake manifold pressure is lower than the atmospheric pressure, the controller 100 maintains the opening degree of the second purge control valve 58 to full opening regardless of a magnitude of the intake manifold pressure. In addition to the lean NA range, also in the stoichiometric NA range and the stoichiometric supercharging range, the opening degree of the second purge control valve 58 is basically the full opening during execution of purging. Meanwhile, in the lean supercharging range where the intake manifold pressure is the atmospheric pressure or higher, the controller 100 decreases the opening degree of the second purge control valve 58 in response to an increase in the intake manifold pressure. In other words, the opening degree of the second purge control valve 58 is decreased as a possibility that scavenging occurs is increased. The intake manifold pressure is measured by a pressure sensor that is not shown and is provided in the intake manifold.

When the operation point of the engine 2 enters the lean scavenging range, the controller 100 sets the opening degree of the second purge control valve 58 to a minimum opening degree that is defined in advance. Because scavenging actively occurs in the lean scavenging range, blowing of the evaporated fuel occurs almost reliably. Thus, as shown in FIG. 3, the minimum opening degree of the second purge control valve 58 that is set in the lean scavenging range may be full closing. The operation range in which the second purge control valve is fully closed is an example of the first operation range. Whether the operation point is in the lean scavenging range is determined from the requested torque and the speed of the engine 2. FIG. 3 illustrates a state where the opening degree of the second purge control valve 58 is continuously changed from the full opening to the full closing with respect to the intake manifold pressure. However, an operation of the second purge control valve 58 immediately before and after the full closing is not necessarily continuous. When the operation point of the engine 2 enters the lean scavenging range, the second purge control valve 58 is discretely and fully closed at the time point.

In the graph of an upper stage, the purge amount of purge gas that flows through the first purge control valve (the downstream-side purge control valve) 52 is indicated by a one-dot chain line. The first purge control valve 52 is basically fully opened during the execution of purging regardless of the magnitude of the intake manifold pressure. Accordingly, the purge amount by the first purge control valve 52 is proportional to differential pressure between the atmospheric pressure and the intake manifold pressure and becomes zero when the intake manifold pressure becomes higher than the atmospheric pressure.

In addition, in the graph of the upper stage, the purge amount of the purge gas that flows through the second purge control valve (the upstream-side purge control valve) 58 is indicated by a solid line and a broken line. The solid line indicates a relationship between the purge amount and the intake manifold pressure when the throttle 26 is fully opened and supercharging pressure (pressure on an upstream side of the throttle 26) is equal to the intake manifold pressure. When the operation of the second purge control valve 58 is conducted as in the graph of the lower stage, the purge amount by the second purge control valve 58 is increased at first along with the increase in the intake manifold pressure. However, the purge amount eventually reaches maximum and is thereafter reduced along with the increase in the intake manifold pressure. Then, the second purge control valve 58 is fully closed in the lean scavenging range. Thus, the purge amount by the second purge control valve 58 becomes zero.

In order to simply prevent blowing of the evaporated fuel in the lean supercharging range, the second purge control valve 58 only has to be fully closed in the entire lean supercharging range. However, if such an operation is conducted, the evaporated fuel stored in the canister 46 can no longer be processed. According to the operation of the second purge control valve 58 that is conducted by the controller 100 in this embodiment, the evaporated fuel stored in the canister 46 can be purged in the lean supercharging range, and the purge amount can be suppressed as scavenging is more likely to occur. In this way, processing of the evaporated fuel that is stored in the canister 46 and suppression of the degradation of the emission performance caused by blowing of the evaporated fuel can simultaneously be achieved.

The broken line in the graph of the upper stage indicates a relationship between the purge amount and the intake manifold pressure when the opening degree of the throttle 26 is decreased and there is a difference between the supercharging pressure and the intake manifold pressure in the lean supercharging range. In this case, before the intake manifold pressure becomes higher than the atmospheric pressure and purging by the first purge control valve 52 is stopped, the supercharging pressure becomes higher than the atmospheric pressure and purging by the second purge control valve 58 is started. In this way, interruption of purging of the evaporated fuel from the canister 46 is avoided when the intake manifold pressure is close to the atmospheric pressure. Furthermore, as it can be understood from a comparison between the solid line and the broken line, in the case where the magnitude of the intake manifold pressure is the same, the supercharging pressure becomes higher when the opening degree of the throttle 26 is decreased. Accordingly, the purge amount by the second purge control valve 58 is increased. Thus, the processing of the evaporated fuel in the lean supercharging range can be promoted by conducting an operation for realizing the relationship indicated by the broken line.

Figure 4:
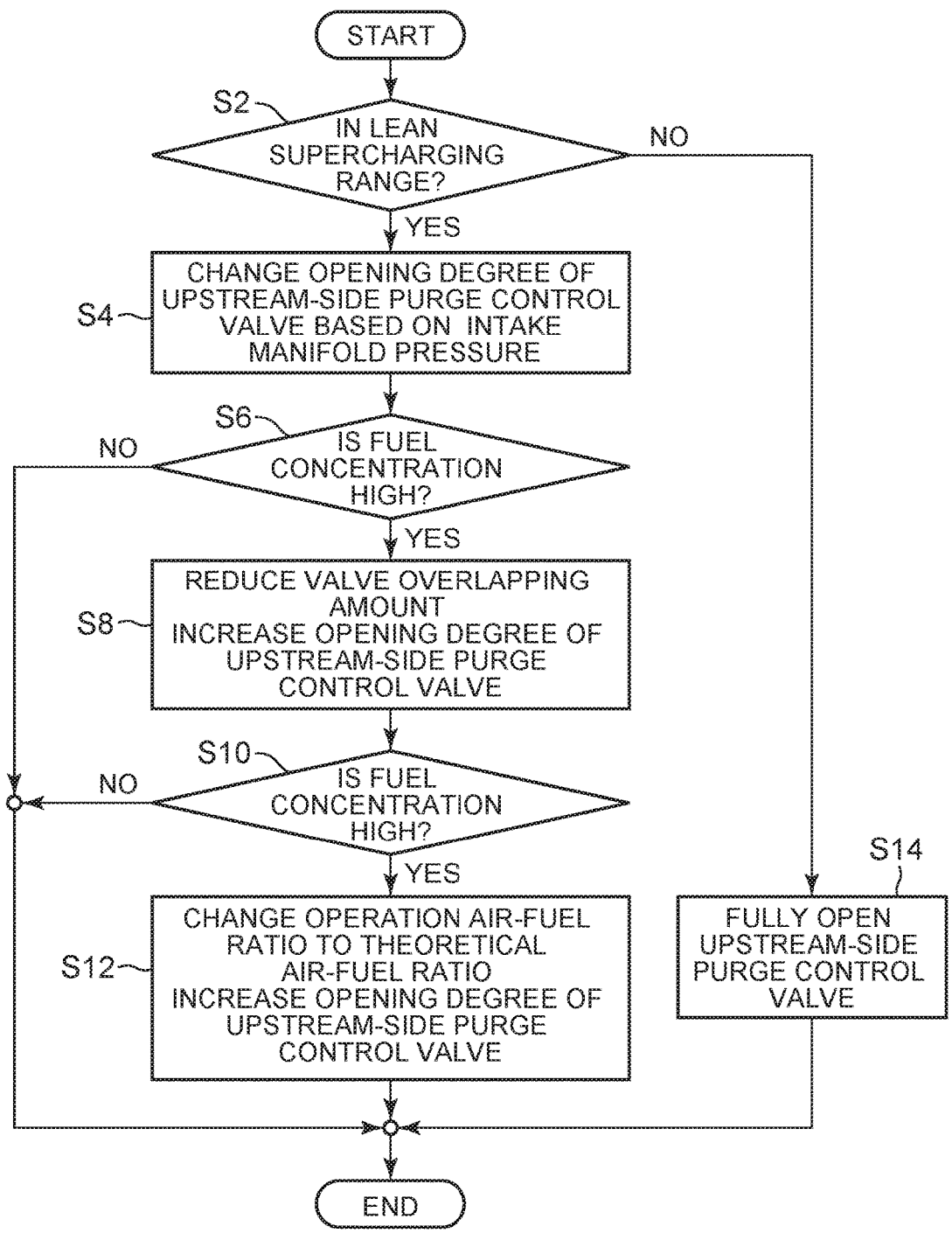
FIG. 4 is a flowchart of a control flow of purge control.

FIG. 4 is a flowchart of a control flow of the purge control in which the second purge control valve 58 is used. A control program that corresponds to this control flow is stored in a memory of the controller 100. The opening degree control of the second purge control valve 58 that has been described by using FIG. 3 is conducted in this control flow.

According to the control flow shown in FIG. 4, the controller 100 first determines whether the operation point of the engine 2 is in the lean supercharging range on the basis of the requested torque to the engine 2 and the speed of the engine 2 (step S2). If the operation point of the engine 2 is not in the lean supercharging range, the controller 100 fully opens the second purge control valve 58 (step S14).

If the operation point of the engine 2 is in the lean supercharging range, as described by using FIG. 3, the controller 100 changes the opening degree of the second purge control valve 58 in response to the magnitude of the intake manifold pressure (step S4).

Next, the controller 100 determines whether fuel concentration of the purge gas that is introduced from the canister 46 into the intake passage 6 is higher than a threshold (step S6). This determination is made to determine whether the canister 46 is in an almost empty state. The controller 100 estimates the fuel concentration of the purge gas on the basis of a difference between an actual air-fuel ratio that is calculated from output of an unillustrated air-fuel ratio sensor and a target air-fuel ratio that is used for calculation of a fuel injection amount in a state where the second purge control valve 58 is opened and the purge gas is purged. Alternatively, the fuel concentration of the purge gas can be estimated from internal pressure of the fuel tank 44. When the fuel concentration of the purge gas is decreased to the threshold, the controller 100 maintains a current opening degree of the second purge control valve 58.

In the case where a state where the fuel concentration of the purge gas is higher than the threshold continues for a specified time since the opening degree of the second purge control valve 58 is changed, the controller 100 operates the variable intake valve mechanism 16 and reduces the valve overlapping amount. In conjunction with this, the controller 100 increases the opening degree of the second purge control valve 58 at a speed that matches a speed of a reduction in the valve overlapping amount (step S8). By conducting such an operation, the valve overlapping amount is reduced. Thus, while blowing of the evaporated fuel is suppressed, the purge amount of the evaporated fuel can be increased.

Again, the controller 100 determines whether the fuel concentration of the purge gas that is introduced from the canister 46 into the intake passage 6 is higher than the threshold (step S10). A determination in step S10 is made to check an effect of the operation conducted in step S8. If the fuel concentration of the purge gas is decreased to the threshold by the operation conducted in step S8, the controller 100 maintains the current valve overlapping amount and the current opening degree of the second purge control valve 58.

If the fuel concentration of the purge gas is higher than the threshold regardless of the operation in step S8, the controller 100 switches the operation air-fuel ratio of the engine 2 to the theoretical air-fuel ratio and further increases the opening degree of the second purge control valve 58 (step S12). By switching the operation air-fuel ratio to the theoretical air-fuel ratio, the exhaust gas temperature is increased, and purification performance of the three-way catalyst 36 is improved. In this way, the purge amount of the evaporated fuel can be increased without degrading the emission performance.

It should be noted that, in an operation in step S12, in order to suppress an increase in torque that is associated with switching to the theoretical air-fuel ratio, the controller 100 decreases the opening degree of the throttle 26 and thereby lowers the intake manifold pressure. Meanwhile, the waste gate valve 34 remains fully closed, and thus lowering of the supercharging pressure is suppressed. By maintaining the supercharging pressure, a suction force of the ejector 56 that is required to purge the evaporated fuel via the second purge control valve 58 can be maintained.

Figure 5:
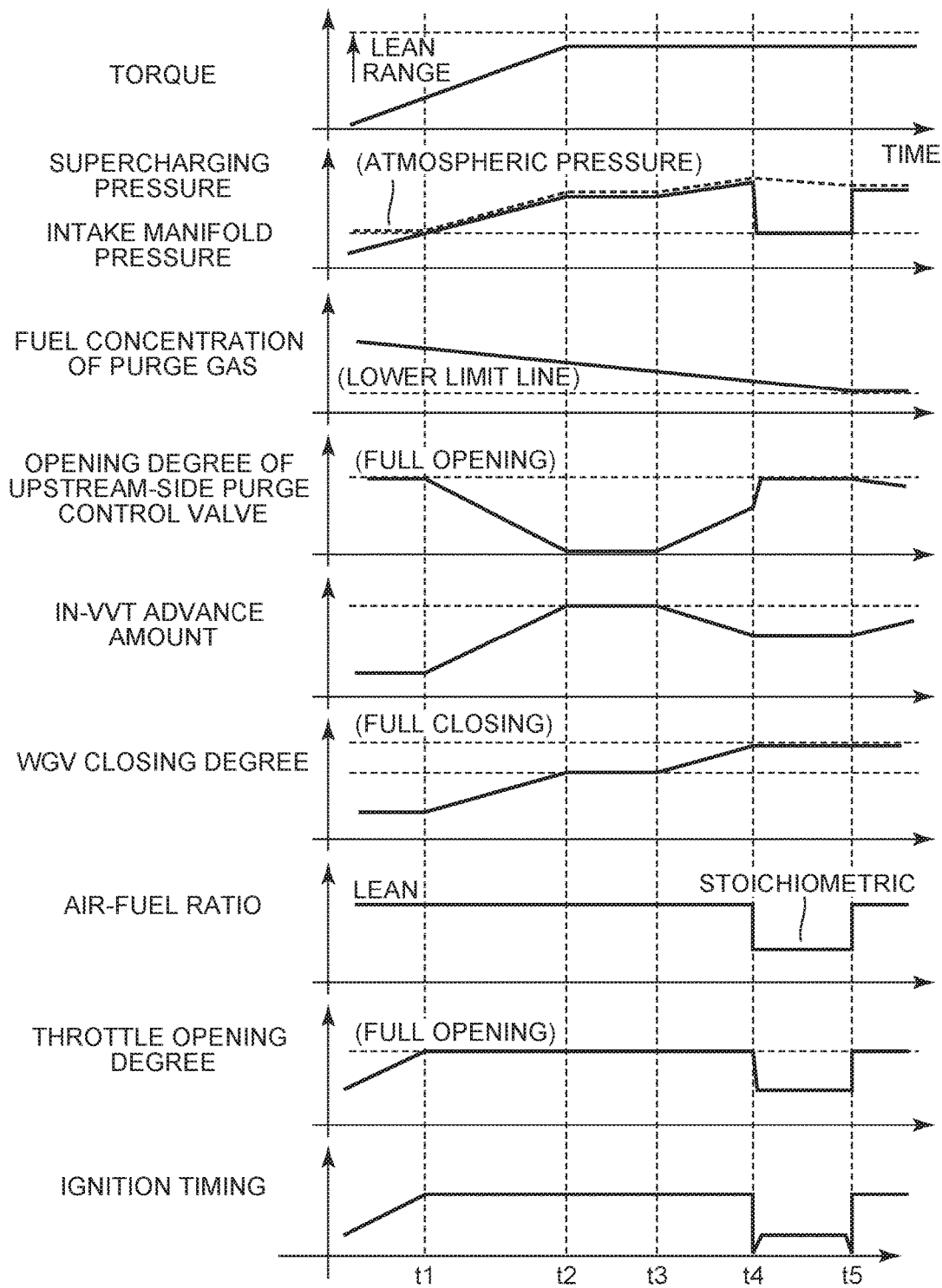
FIG. 5 is a time chart of an operation of a system by the control flow shown in FIG. 4.

FIG. 5 is a time chart of an operation of the engine system when the above control flow is conducted. A chart at a first stage shows the torque output by the engine 2 during acceleration from the lean NA range. A chart at a second stage shows the supercharging pressure by a broken line and the intake manifold pressure by a solid line. A chart at a third stage shows the fuel concentration of the purge gas. A chart at a fourth stage shows an opening degree of the second purge control valve (the upstream-side purge control valve) 58. A chart at a fifth stage shows an advance amount of the valve timing of the intake valve 10 (an IN-VVT advance amount) by the variable intake valve mechanism 16. A chart at a sixth stage shows a closing degree of the waste gate valve 34 (a WGV closing degree). A chart at a seventh stage shows the operation air-fuel ratio of the engine 2. A chart at an eighth stage shows the opening degree of the throttle 26. A chart at a ninth stage shows ignition timing.

According to this time chart, at time t1, the throttle 26 is fully opened, and the intake manifold pressure becomes equal to the atmospheric pressure. At the time t1 onward, the waste gate valve 34 is gradually closed, and the supercharging pressure is increased. Because the throttle 26 is maintained to be fully opened, the intake manifold pressure becomes equal to the supercharging pressure and is increased along with the supercharging pressure. In addition, the valve timing of the intake valve 10 is advanced so as to increase the filling efficiency of the fresh air. Furthermore, at the time t1 onward, at which the supercharging pressure becomes higher than the atmospheric pressure, in conjunction with the above operation, the opening degree of the second purge control valve 58 is gradually decreased in response to the increase in the intake manifold pressure.

At time t2, the operation point of the engine 2 eventually reaches a target operation point in the lean supercharging range. At the time t2 onward, in order to maintain the torque of the engine 2 to be stable, the waste gate valve 34 is maintained to a closing degree at the time t2, and the valve timing of the intake valve 10 is maintained to an advance amount at the time t2. Because the closing degree of the waste gate valve 34 is maintained, changes in the supercharging pressure and the intake manifold pressure at the time t2 onward are suppressed. In addition, because the increase in the intake manifold pressure is stopped, a decrease in the opening degree of the second purge control valve 58 is also stopped, and the second purge control valve 58 is maintained to the opening degree at the time t2.

At time t3 at which a specified time has elapsed since the time t2, it is determined whether the fuel concentration of the purge gas is decreased to a lower limit line as the threshold. In an example of the time chart, the fuel concentration at the time t3 is higher than the lower limit line. For this reason, in order to reduce the valve overlapping amount, the valve timing of the intake valve 10 is delayed. In addition, in order to increase the purge amount by the second purge control valve 58, the opening degree of the second purge control valve 58 is increased at a speed that matches the speed of the reduction in the valve overlapping amount. Furthermore, in order to compensate for degradation of the filling efficiency that is caused by a delay in the valve timing of the intake valve 10, the waste gate valve 34 is further closed, and the supercharging pressure and the intake manifold pressure continue to be increased.

At time t4 at which the waste gate valve 34 is fully closed, it is determined again whether the fuel concentration of the purge gas is decreased to the lower limit line. In an example of the time chart, the fuel concentration at the time t4 is higher than the lower limit line. Accordingly, the operation air-fuel ratio of the engine 2 is switched from a lean air-fuel ratio to the theoretical air-fuel ratio (stoichiometric). At the same time, the second purge control valve 58 is opened to the full opening. In addition, while the waste gate valve 34 remains fully closed, the throttle 26 is closed to suppress the increase in the torque that is caused by switching to the theoretical air-fuel ratio. Because the waste gate valve 34 is maintained to be fully closed, lowering of the supercharging pressure, which is a source of the suction force of the ejector 56, can be suppressed. Furthermore, because MBT (minimum (spark advance for) best torque) is changed by changes in an air amount and the air-fuel ratio, the ignition timing is delayed in response to shifting of the operation air-fuel ratio to the stoichiometric air-fuel ratio.

Thereafter, at time t5 at which the fuel concentration of the purge gas is decreased to the lower limit line, the operation air-fuel ratio of the engine 2 is switched again to the leaner air-fuel ratio than the theoretical air-fuel ratio, and the throttle 26 is fully opened again. In addition, because the MBT is changed by the changes in the air amount and the air-fuel ratio, the ignition timing is advanced again in response to shifting of the operation air-fuel ratio to the lean air-fuel ratio.

In the opening degree control of the second purge control valve 58, which is shown in FIG. 3, the opening degree of the second purge control valve 58 is continuously changed with respect to the intake manifold pressure. However, this is merely one example of a method for decreasing the opening degree of the second purge control valve 58 in response to the increase in the intake manifold pressure. As a method for controlling the opening degree of the second purge control valve 58, the opening degree may be decreased stepwise in response to the increase in the intake manifold pressure.

In the control flow shown in FIG. 4, the operation air-fuel ratio is switched to the theoretical air-fuel ratio in the case where it is determined in step S10 that the fuel concentration of the purge gas is not sufficiently decreased. However, instead of this configuration, the operation air-fuel ratio may be switched to the theoretical air-fuel ratio in the case where a fluctuation in combustion of the engine 2 is increased or in the case where target torque cannot be obtained due to a reduction in the valve overlapping amount.

In this embodiment, the purge control valve is provided for each of the first evaporated fuel passage through which the evaporated fuel is purged into the intake manifold and the second evaporated fuel passage through which the evaporated fuel is purged into the upstream side of the compressor. However, the purge control valve may be provided immediately before a branch point of the first evaporated fuel passage and the second evaporated fuel passage, and the purge gas can be controlled by this purge control valve.

A supercharger of this embodiment is a turbocharger for driving the compressor by the turbine. However, in the configuration, the supercharger may be an electric supercharger for driving the compressor by a motor or may be a mechanical supercharger for driving the compressor by the engine.

What is claimed is:

1. A controller for an internal combustion engine including
    a compressor provided in an intake passage,
    a three-way catalyst provided in an exhaust passage,
    a canister configured to store evaporated fuel generated in a fuel tank,
    an evaporated fuel passage configured to connect the canister and an upstream side of the compressor in the intake passage,
    an ejector configured to suction the evaporated fuel from the canister by differential pressure between the upstream side of the compressor and a downstream side of the compressor, and
    a purge control valve provided between the canister and the ejector in the evaporated fuel passage, and
    the controller comprising:
    an electronic control unit, the electronic control unit configured to decrease an opening degree of the purge control valve in response to an increase in pressure on the downstream side of the compressor in a lean supercharging range, wherein
        an operation air-fuel ratio of the internal combustion engine being leaner than a theoretical air-fuel ratio of the internal combustion engine in the lean supercharging range, and the pressure on the downstream side of the compressor being higher than pressure on the upstream side of the compressor in the lean supercharging range.

2. The controller for the internal combustion engine according to claim 1, wherein
    the electronic control unit is configured to fully close the purge control valve in a first operation range, where suctioned air is blown from the intake passage to the exhaust passage in the first operation range, and the first operation range is included in the lean supercharging range.

3. The controller for the internal combustion engine according to claim 1, wherein
    the electronic control unit is configured to fully close the purge control valve in a second operation range, where a valve opening period of an exhaust valve and a valve opening period of an intake valve overlap in the second operation range, and the second operation range is included in the lean supercharging range.

4. The controller for the internal combustion engine according to claim 3, wherein when fuel concentration of purge gas that is introduced from the canister to the intake passage is not decreased to a threshold after the opening degree of the purge control valve is decreased, the electronic control unit is configured to
i) reduce an overlapping amount between the valve opening period of the exhaust valve and the valve opening period of the intake valve, and
ii) increase the opening degree of the purge control valve.

5. The controller for the internal combustion engine according to claim 4, wherein
after the opening degree of the purge control valve is decreased, the electronic control unit is configured to
i) switch the operation air-fuel ratio of the internal combustion engine to the theoretical air-fuel ratio when the fuel concentration of the purge gas that is introduced from the canister to the intake passage is not decreased to the threshold, and
ii) increase the opening degree of the purge control valve.

6. A control method for a vehicle including
an internal combustion engine,
a compressor provided in an intake passage,
a three-way catalyst provided in an exhaust passage,
a canister configured to store evaporated fuel generated in a fuel tank,
an evaporated fuel passage configured to connect the canister and an upstream side of the compressor in the intake passage,
an ejector configured to suction the evaporated fuel from the canister by differential pressure between the upstream side of the compressor and a downstream side of the compressor,
a purge control valve provided between the canister and the ejector in the evaporated fuel passage, and
an electronic control unit,
the control method comprising:
decreasing an opening degree of the purge control valve in response to an increase in pressure on the downstream side of the compressor by the electronic control unit in a lean supercharging range, wherein an operation air-fuel ratio of the internal combustion engine being leaner than a theoretical air-fuel ratio of the internal combustion engine in the lean supercharging range, and the pressure on the downstream side of the compressor being higher than pressure on the upstream side of the compressor in the lean supercharging range.

7. The control method of claim 6 further comprising:
fully closing the purge control valve in a first operation range, where suctioned air is blown from the intake passage to the exhaust passage in the first operation range, and the first operation range is included in the lean supercharging range.

8. The control method of claim 6 further comprising:
fully closing the purge control valve in a second operation range, where a valve opening period of an exhaust valve and a valve opening period of an intake valve overlap in the second operation range, and the second operation range is included in the lean supercharging range.

9. The control method of claim 8, wherein when fuel concentration of purge gas that is introduced from the canister to the intake passage is not decreased to a threshold after the opening degree of the purge control valve is decreased, the control method further comprising:
i) reducing an overlapping amount between the valve opening period of the exhaust valve and the valve opening period of the intake valve, and
ii) increasing the opening degree of the purge control valve.

10. The control method of claim 9 wherein after the opening degree of the purge control valve is decreased, the control method further comprising:
i) switching the operation air-fuel ratio of the internal combustion engine to the theoretical air-fuel ratio when the fuel concentration of the purge gas that is introduced from the canister to the intake passage is not decreased to the threshold, and
ii) increasing the opening degree of the purge control valve.

* * * * *